United States Patent [19]

Gallacher

[11] 4,018,865

[45] Apr. 19, 1977

[54] SOLVENT-EXTRACTION PROCESS FOR RECOVERY AND SEPARATION OF METAL VALUES

[75] Inventor: Lawrence V. Gallacher, East Norwalk, Conn.

[73] Assignee: King Industries, Inc., Norwalk, Conn.

[22] Filed: Mar. 29, 1976

[21] Appl. No.: 671,346

[52] U.S. Cl. .................................. 423/24; 423/99; 423/139; 75/101 BE; 75/117; 75/119; 75/120; 75/121

[51] Int. Cl.$^2$ ................. B01D 15/04; C22B 15/00; C22B 23/04; C22B 19/26

[58] Field of Search ............. 75/101 BE, 117, 119, 75/120, 121; 423/24, 99, 139

[56] References Cited

UNITED STATES PATENTS

| 3,128,156 | 4/1964 | Long et al. ................... 75/101 BE |
| 3,432,257 | 3/1969 | Spitzer et al. ................. 75/101 BE |
| 3,507,645 | 4/1970 | Spitzer et al. ..................... 75/119 |
| 3,878,286 | 4/1975 | Morin et al. ........................ 423/24 |

Primary Examiner—G. Ozaki
Attorney, Agent, or Firm—Morgan, Finnegan, Pine, Foley & Lee

[57] ABSTRACT

The metal value separation efficiencies of aliphatic α-hydroxy oximes in solvent-extraction processes are enhanced by the addition to the solvent-extractant of an alkyl aromatic sulfonic acid having a molecular weight of at least about 400, the mole % of the sulfonic acid in the combined sulfonic acid and hydroxy oxime being in the range of 10 to 80. Especially important applications for the improved solvent-extractant are in the separation and recovery of copper from iron, nickel from iron, nickel from cobalt, copper from cobalt, copper from nickel, copper from zinc, zinc from nickel, nickel from zinc, zinc from iron and cobalt from zinc in acidic aqueous media.

28 Claims, No Drawings

SOLVENT-EXTRACTION PROCESS FOR RECOVERY AND SEPARATION OF METAL VALUES

This invention relates to a solvent-extractant method for separating and recovering difficulty separable metal values in aqueous acidic media. In particular, it is concerned with the use of an alkyl aromatic sulfonic acid as an addition to a solution comprising an aliphatic α-hydroxy oxime to provide enhanced extraction efficiency from acid aqueous solutions of copper and other metal values, particularly at low pH, and superior selectivity in recovering one metal from mixtures with others.

BACKGROUND OF THE INVENTION

Many processes have been proposed for separating metals, one from another. One commercially significant method comprises selective extraction of one metal from another from an aqueous solution of the pair using a solvent-extractant in which the first metal valve is preferentially soluble, leaving the second metal behind, in the aqueous solution. Among the most difficult to separate metal pairs are copper from iron, nickel from iron, nickel from cobalt, copper from cobalt, copper from nickel, copper from zinc, zinc from nickel, nickel from zinc, zinc from iron, and cobalt from zinc, and the like.

In Swanson, U.S. Pat. No. 3,224,873, a family of aliphatic α-hydroxy oximes is disclosed to be useful in solvent-extractant processes for recovering copper from aqueous solutions derived from acid leaching of ores. In Swanson, U.S. Pat. No. 3.428,449, a family of 2-hydroxy benzophenone oximes is used to recover copper in the presence of iron, and it is disclosed that a small amount of aliphatic α-hydroxy oximes enhances the rate of extraction of copper. Hazen and Coltrinari, U.S. Pat. No. 3,872,209, have found that the rate of extraction of copper is enhanced by using an organophosphoric acid additive in the solvent-extractant containing a 2-hydroxy benzophenone oxime. This permits the use of shorter contact times and smaller mixer-settlers. Morin and Peterson, U.S. Pat. No. 3,878,286, have discovered that the rate of extraction of copper by solutions of aliphatic α-hydroxy oximes and 2-hydroxybenzophenone oximes is enhanced by the addition of small amounts of sulfo compound, such as a dialkyl sulfosuccinate, an alkyl naphthalene sulfonic acid or a long chain monoalkyl sulfate. Moreover, the use of the sulfo additives were reported to increase the selectivity of the oxime reagents for copper in the presence of iron. With particular reference to the alkyl naphthalene sulfonics, Morin and Peterson state that the proportion of sulfo compound can go from 0.05 to 13 parts by weight per 100 parts of hydroxy oxime component. Higher amounts are said to lead to emulsions, which are undesirable in a mixing-settling operation, for obvious reasons. In any event, the Morin and Peterson disclosure clearly teaches that maximum mole % of alkylnaphthalene sulfonic acid in the total combination of acid and -hydroxy oxime, assuming that dinonylnaphthalene sulfonic acid and 5,8-diethyl-7-hydroxydodecan-6-one oxime are used, is 7,1 mole %. The disclosures of the above-mentioned patents are incorporated herein by reference.

It has now been discovered that if an aliphatic α-hydroxy oxime is used in combination with a high molecular weight alkylaromatic sulfonic acid and if the ratio of sulfonic acid to oxime taught to be the maximum by Morin and Peterson is substantially exceeded, e.g., by more than 40%, in the extraction of acidic solutions of copper, nickel, iron, cobalt and zinc, individually or in combination, the selectivity of the extraction and efficiency are remarkably increased. No emulsification problems are encounter, although, if equivalent mixing is used, longer separation times are required, but extraction equilibrium is achieved rapidly, and therefore long and intensive mixing is not required. Tests have shown that the equilibrium extraction efficiency or aromatic hydroxy oximes, such as 2-hydroxy-5-nonyl-benzophenone oxime, is not improved by the use of the additive in the amounts specified herein, and in fact an antagonistic effect is observed. Moreover, if the mole % of sulfonic acid is lowered, with respect to the total of sulfonic acid and α-hydroxy oxime, into the range used by Morin and Peterson, the loading of extracted metal values decreases to an undesirable level, and maximum selectivity cannot be achieved.

SUMMARY OF THE INVENTION

According to the present invention, there is provided a process for recovering a first metal value from an aqueous solution including at least a pair of first and second metal values, the process comprising contacting the aqueous solution at a pH of below about 3 with a solvent-extractant consisting of (i) an aliphatic α-hydroxy oxime, (ii) an alkylaromatic sulfonic acid having a molecular weight of at least about 400 and (iii) a water-immiscible solvent for (i), (ii) and metal complexes of (i) and (ii) to provide a solution of the first metal value in the solvent-extractant, the mole % of (ii) in the combined (i) and (ii) being in the range of 10 to 80, preferably 15 to 70 and, most preferably 25 to 55; separating the solution thus formed from the aqueous raffinate depleted in the first metal value; and recovering the first metal value from the separated solution.

Many of the modern mining and metallurgical procedures can be carried out to produce suitable aqueous metal feed solutions for the present process. The process of the present invention has specific application to the separation of copper values from an aqueous solution of copper and iron values. The process can be used to obtain a first solvent fraction concentrated in copper and an aqueous raffinate fraction concentrated in iron. Further, the process also has specific and advantageous application to the separation of other difficult to separate metals in aqueous solutions. These additional mixtures of the following pairs of metals are suitable feed solutions for the present process to separate the metals from each other: copper from iron, nickel from iron, nickel from cobalt, copper from cobalt, copper from nickel, copper from zinc, zinc from nickel, nickel from zinc, zinc from iron, and cobalt from zinc.

In general, any of the α-hydroxy oximes described in U.S. Pat. No. 3,224,873 are suitable for use in the present process. In general, these α-hydroxy oxime extractants (i) have the formula:

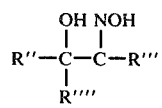

wherein R'', T''' and R'''' may be any of a variety of organic hydrocarbon radicals such as aliphatic and alkylaryl radicals, R'''' may also be hydrogen. Preferably, R'' and R''' are unsaturated hydrocarbon or branched chain alkyl groups, containing from about 4 to 20 carbon atoms, R'' and R''' are also preferably the same, and when alkyl are preferably attached to the carbons substituted with the —OH and =NOH groups attached through a secondary carbon atom. It is also preferred that R'''' is hydrogen or unsaturated hydrocarbon or branched chain alkyl group containing from about 4 to 20 carbon atoms. The α-hydroxy oximes also preferably contain a total of about 10 to 42 carbon atoms. Representative compounds are given in the foregoing reference and processes are disclosed for preparing them.

Typical compounds are 19-hydroxyhexatriconta-9,27-dien-18-oxime; 5,10-diethyl-8-hydroxytetradecan-7-oxime; and 5,8-diethyl-7-hydroxydodecan-6-oxime. The latter compound has the following structural formula:

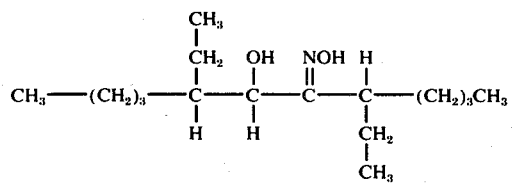

Representative of other mono- and poly-unsaturated radicals are heptenyl, octenyl, decenyl, dodecenyl, octadencenyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl, and the like.

The α-hydroxy oxime component is also characterized as having a solubility of at least 2% by weight in the hydrocarbon solvent used to made up the organic phase and substantially complete insolubility in water.

The alkyl aromatic sulfonic acids having a molecular weight of at least about 400 (ii) used in practicing the present process can vary widely in chemical nature, so long as they have a minimum molecular weight of about 400 and at least one, and preferably two, alkyl groups on the aromatic sulfonic acid nucleus. If a phenyl nucleus is present, these requirements can be met with a benzene sulfonic acid containing at least two alkyl groups having a total of 20 carbon atoms, e.g., didecylbenzenesulfonic acid, or four alkyl groups having a total of 20 carbon atoms, e.g., tetrapentylbenzenesulfonic acid, Alkylaromatic polysulfonic acids should also have a ratio of molecular weight to number of sulfonic acid groups of at least 400:1. Instead of phenyl nucleus, the aromatic nucleus can be polycyclic, e.g., naphthalene, anthracene, phenanthrene, tetrahydronaphthalene, etc. Many variations in the position of substitution are possible and contemplated and mixed positional isomers are included. The alkyl substituents can be straight or branched chain. Additional groups such as hydroxy, ether, halogens, etc., can also be present. Best results are obtained with maximum variations in substituent locations and with maximum branching.

The most preferred alkylaromatic sulfonic acids are branched polyalkyl substituted naphthalene sulfonic acids. These are available, for example, by sulfonating polyalkylnaphthalenes. The polyalkylnaphthalenes can be made by alkylating naphthalene with olefins, for example, propylene trimer or tetramer, or alkyl halides, with a suitable catalyst, e.g., hydrogen fluoride or anhydrous aluminum chloride in a suitable solvent such as naphtha, sulfur dioxide, nitrobenzene or a mixture of benzene and nitrobenzene. See Robert G. King and George W. Thielcke, U.S. Pat. No. 2,764,548, assigned to the assignee of the present invention. Such a process produces naphthalene substituted with alkyl groups and, if a branched olefin is used, such as propylene trimer or propylene tetramer, obtained by polymerizing propylene by an acid catalyst such as phosphoric acid, then the alkyl groups will be highly branched as well. Sulfonation is obtained by treating the polyalkylaromatic with a sulfonating agent. For example, the dialkyl aromatic compound is dissolved in an inert solvent, such as petroleum naphtha, hexane, heptane, octane, chlorinated solvents, and the like, and sulfuric acid, preferably oleum, is introduced into the solution at the desired temperature and with agitation. After reaction is complete, the sulfonic acid — and also some polysulfonic acid — is recovered by adding water to selectively extract any polysulfonic acid, leaving the alkyl-aromatic sulfonic acid in the organic phase. Detailed techniques for preparing dinonylnaphthalene sulfonic acid, didodecylnaphthalene sulfonic acid and isomers and analogs thereof, including the benzene analogs, is described in the King et al patent, U.S. Pat. No. 3,764,548, incorporated herein by reference.

The solvent-extractant as contemplated above, includes (i) an aliphatic α-hydroxy oxime, (ii) an aromatic sulfonic acid and (iii) a water-immiscible solvent for (i) and (ii) and metal complexes thereof. A wide variety of water-immiscible organic solvents (diluents), in which the extraction reagents (i) and (ii) are dissolved, can be employed according to this invention. The minimum requirements for the diluent (iii), however, are that the diluent be substantially water-immiscible, that it will dissolve the extraction reagents, and that it will not interfere with the function of the reagent in extracting the metal values from acid solutions. These diluents can be aliphatic or aromatic hydrocarbons, halogenated hydrocarbons, petroleum, derivatives, ethers, etc. Examples of these various diluents include toluene, carbon tetrachloride, benzene, xylene, fuel oil, chloroform, 2-ethyl-hexanol, and particularly kerosene.

Generally, the hydroxy oxime extractant will be present in the organic phase in an amount sufficient to extract at least a portion of the first metal values, e.g., copper values, from the aqueous solutions. Preferably, the oxime will be present in the amount of from about 1 to about 25% by weight based on the total organic phase with an amount of from 2 to 15% by weight being particularly preferred.

In achieving all of the advantages of this invention, it is critical that the sulfonic acid compound (ii) be used in a proportion of 10 to 80 mole % in the combined aliphatic α-hydroxy oxime (i) and sulfonic acid (ii). With the most efficient aromatic sulfonic acids, the mole % of (i) in combined (i) and (ii) will be in the range of 15 to 70, and especially in the range of 15 to 55. When less than 10 mole % of the sulfonic acid is used, the extraction of the first metal value is suppressed to below commercially significant loadings. With more than 80% of the sulfonic acid in the combination, selectivity tends to decrease with variations, depending on the particular metal values involved.

Although the volumetric phase ratios of the organic extractant to the aqueous solution can vary depending upon several factors including the amount of first metal present in the aqueous phase and the concentrations of hydroxy oxine (i) and alkylaromatic sulfonic acid (ii) in the organic phase, generally, volumetric phase ratios of from about 1:3 to about 3:1 will be used. These ratios will extract essentially all of the first metal from the aqueous within a small number of extraction stages, e.g., 5 or less. In continuous column extractors or similar equipment, 5 or fewer contacts or theoretical plates will normally suffice. Under most circumstances, an extraction or contacting period per stage of at most five minutes is sufficient, although the extraction time usually may be reduced to 1 to 2 minutes, and often 30 seconds or less.

The solvent-extractant reagent may be contacted with the metal containing aqueous feed by any of the well-known procedures employed in solvent-extractions. While continuous countercurrent methods are preferred, batch, continuous bath, and batch countercurrent methods may also be used. The liquid-liquid contacting means may comprise a pulse column, a countercurrent rotating disc column, and other known systems. Mixing may be carried out at conventional temperatures, advantageously in the range of about 10° C. to 40° C.

The extraction generally will take place at a pH of below about 3.5, preferably below 3.0 and especially preferably in the range of 0.75 to 2.5. For the pair copper and iron, the most preferably pH is from about 0.9 to 2.0; for the pair nickel and iron, the most preferably range is from about 1.0 to 2.0; for the pair nickel and cobalt, the most preferable pH is from about 0.98 to 2.0; for the pair copper and nickel, the most preferable range is from about 1.0 to about 2.5; for the pair copper and cobalt, the most preferable range is from about 1.0 to about 2.5; for the pair copper and zinc, the most preferable range is from 1.0 to about 2.0; for the pair nickel and zinc (and zinc and nickel), the most preferable range is 1.0 to about 2.0; and for the pair zinc and iron, the most preferable range is 1.0 to about 2.3.

The organic phase to aqueous phase volume ratio can be varied broadly and the most efficient ratio in each case can be readily determined by one skilled in the art. The particular ratio selected for any given extraction may depend upon the extraction reagent, diluent, and type of metal bearing solution employed as well as their concentration and the method of mixing them, and the like.

After the first metal values have been transferred to the organic phase and the aqueous and organic phases separated, the organic phase containing the first metal value is stripped in any suitable liquid-liquid contactor. In the stripping operation, the first metal containing organic phase is contacted with 10 to 150% by volume of a mineral acid, e.g., sulfuric, nitric of hydrochloric, the choice of acid depending on the anion of the metal required.

For convenience, the extraction, separation of phases and stripping operations may be carried out on a test basis in separatory funnels. These correlate well with commerical size operations. Equipment useful in commercial practice is well known and is described in Mining Engineering, 17, pp. 76–80, December, 1965. The determination of maximum loading capacity of the organic solution for metals, equilibrium isotherms for extraction and stripping, and use of the equilibrium isotherms for determining the number of extraction stages required for substantially complete removal of the metal are set forth in the article, which is incorporated herein by reference.

In a commerical operation, the aqueous feed and the extractant solutions are fed in the desired ratio into a small agitated mixer. After mixing for one to two minutes, or less, the mixture overflows to a settler for a period of about five minutes, residence. The phases are then separated continuously, the aqueous raffinate being drawn off and the organic layer transferred to an agitated stripper vessel where acid is added and mixed for about one to two minutes or less. The mixture is then transferred to a settler where, after a few minutes, the phases are separated.

DESCRIPTION OF THE PREFERRED EMBODIMENTS

The following examples illustrate the process of the present invention, but are not intended to limit it in any manner whatsoever. In addition, certain comparative procedures are set forth to permit the advantages in proceeding according to the present invention to be clearly evident.

EXAMPLE 1

A solution of 4% by weight of 5,8-diethyl-7-hydroxydodecan-6-one oxime in kerosene is prepared. There is also prepared a solution of 10% by weight of dinonlynaphthalene sulfonic acid (DNNSA) in kerosene. An acidic aqueous solution containing 4.0 grams per liter of Cu (II), 2.0 grams per liter of Fe (III) and 0.4 grams per liter of Fe (II), all as the sulfates, is prepared for use as an aqueous feed and the pH is adjusted to 1.6 with 6 $H_2SO_4$. A solvent-extractant composition is made by mixing 2: ml. of the oxime solution with 5 ml. of the DNNSA solution. The mole % of sulfonic acid in the mixture of oxime and sulfonic acid is 27%. Then 25 ml. of the solvent-extractant composition is shaken for one minute with 25 ml. of the aqueous feed solution in a 250 ml. separatory funnel. The organic and aqueous layers are allowed to separate for about 5 minutes. A portion of the aqueous phase is withdrawn and diluted 1:200 with deionized water and then analyzed for copper and for iron using atomic absorption. It is found that 27.3% of the copper has been extracted from the aqueous feed solution, and that no iron has extracted, thus demonstrating the rapid extraction of copper from a typical metallurgically important feed solution and also the high selectivity of the solvent-extractant for copper in the presence of iron at low pH values.

EXAMPLES 2 – 3

The procedure of Example 1 is repeated, varying the ratio of oxime to sulfonic acid in the solvent-extractant composition. For comparison purposes, two additional experiments, Control A and Control B are carried out in which the solvent-extractant comprises only the hydroxy oxime (A) and only the sulfonic acid (B). The mixing times, and the results obtained, together with results of Example 1, are set forth in Table 1, as follows:

Table 1.

Extraction of Copper in the Presence of Iron With a Solvent-Extractant Comprising 5,8-diethyl-7-hydroxydodecan-6-one oxime and DNNSA

| Example | ml. 4% oxime/ ml. 10% DNNSA | Mole % DNNSA in oxime & DNNSA | mixing time, minutes | % copper extracted | % iron extracted |
|---|---|---|---|---|---|
| Control A | 25/0 | 0 | 2 | 0.0 | 0.0 |
| 2 | 23/2 | 11 | 1 | 12.5 | 0.0 |
| 1 | 20/5 | 27 | 1 | 27.3 | 0.0 |
| 3 | 15/10 | 50 | 1 | 35.5 | 3.8 |
| Control B | 0/25 | 100 | 1 | 44.6 | 41.7 |

It is seen that the extractant containing oxime alone extracts neither metal, but that the combinations extract copper efficiently while rejecting iron, at least until a substantial level of DNNSA is present in the mixed solvent-extractant.

The extractants are stripped using 6 N $H_2SO_4$ in two stages and 3 N $H_2SO_4$ in one stage. Stripping is carried out with 25 ml. of the solvent-extractant containing copper values using 25 ml. of the acid. The liquids are shaken for 1 minute, allowed to separate for 5 minutes and the aqueous phase is analyzed. The results are set forth in Table 1A.

Table 1A.

Stripping of Copper from Solvent-Extractants Comprising 5,8-diethyl-7-hydroxydodecan-6-one oxime and DNNSA

| Vol. Ratio 4% oxime/10% DNNSA | Solution I, 3 N $H_2SO_4$ Cu,g/l | % stripped | Soln. II, 6 N $H_2SO_4$ Cu,g./l. | % stripped 1st Stage | 2nd Stage |
|---|---|---|---|---|---|
| 23:2 | 0.62 | 64.1 | 0.52 | 80.9 | 96.2 |
| 20:5 | 1.22 | 50.7 | 1.10 | 75.1 | 94.4 |
| 15:10 | 1.10 | 84.1 | 1.58 | 96.8 | 99.9 |
| 0:25 | 1.24 | 93.5 | 2.53 | 97.6 | 99.9 |

The results in the table indicate highly effective stripping

EXAMPLES 4 – 6

The procedure of Example 1 is repeated using a 1 minute mixing time and varying the concentrations of copper and iron in the feed solutions. The three feed solution concentrations and the results obtained are set forth in Table 2.

Table 2.

Recovery of Copper in the Presence of Iron with a Mixture of 5,8-diethyl-7-hydroxydodecan-6-one oxime and DNNSA

| Example | Feed Solution (g./l.) Cu (II) | Fe (III) | Fe (II) | % Copper Extracted | % Iron Extracted |
|---|---|---|---|---|---|
| 4 | 1.0 | 0.5 | 0.1 | 99.0 | 4.0 |
| 5 | 2.0 | 1.0 | 0.2 | 58.7 | 0.0 |
| 6 | 4.0 | 2.0 | 0.4 | 31.0 | 0.3 |

These results confirm the existence of a strong equilibrium synergism between 5,8-diethyl-7-hydroxydodecan-6-one oxime and DNNSA at a pH of 1.6, the mole % of the sulfonic acid in the combined oxime and sulfonic acid being 27%.

EXAMPLES 7 – 12

The procedure of Examples 1 through 3 are repeated except that the pH of the feed solution is adjusted to 2.0 and 0.9 with 6 N $H_2SO_4$. For comparison purposes, control experiments were carried out using the oxime alone as an extractant and the sulfonic acid only as an extractant.

The conditions employed and the results obtained are summarized in Table 3.

Table 3.

Separation of Copper From Iron with 5,8-diethyl-7-hydroxydodecan-6-one oxime and DNNSA at pH 2 and pH 0.9

| Example | Extractant Mixture ml. 4% Oxime/ ml. 10% DNNSA | Mixing Time (Min.) | % Cu Ext'd | % Fe Ext'd |
|---|---|---|---|---|
| pH 2.0 | | | | |
| Control C | 25/0 | 2 | 7.0 | 3.7 |
| 7 | 23/2 | 1 | 17.6 | 9.0 |
| 8 | 20/5 | 1 | 31.0 | 13.3 |
| 9 | 15/10 | 1 | 39.6 | 20.3 |
| Control D | 0/25 | 1 | 47.6 | 42.2 |
| pH 0.9 | | | | |
| Control E | 25/0 | 2 | 0.0 | 0.0 |
| 10 | 23/2 | 1 | 12.4 | 0.0 |

Table 3.-continued

Separation of Copper From Iron with 5,8-diethyl-7-hydroxydodecan-6-one oxime and DNNSA at pH 2 and pH 0.9

| Example | Extractant Mixture ml. 4% Oxime/ ml. 10% DNNSA | Mixing Time (Min.) | % Cu Ext'd | % Fe Ext'd |
|---|---|---|---|---|
| 11 | 20/5 | 1 | 27.6 | 1.7 |
| 12 | 15/10 | 1 | 27.6 | 0.0 |
| Control F | 0/25 | 1 | 31.0 | 28.8 |

Thus, the effectiveness of 5,8-diethyl-7-hydroxydodecan-6-one oxime and DNNSA in combination is sharply improved at the pH range of below 2 and there is only a slight drop in copper extraction efficiency at pH 0.9, in comparison with pH 1.6 (Examples 1–3).

EXAMPLES 13 – 15

The procedure of Example 1 is repeated, except that the concentration of oxime and sulfonic acid in the kerosene solvent are increased by a factor of 2.5 to 10 weight % and to 25 weight %, respectively. For comparison purposes, solvent-extractants including only the oxime and only the sulfonic acid are also evaluated (Controls G and H, respectively). The conditions used and the results obtained are set forth in Table 4.

Table 4.

Separation of Copper and Iron with 5,8-diethyl-7-hydroxydodecan-6-one oxime and DNNSA, Concentrated, in Kerosene, at pH 1.6

| Example | ml. 10% oxime/ ml. 25% DNNSA | Mole % DNNSA in oxime & DNNSA | Mixing Time, Minutes | % copper Extracted | % iron Extracted |
|---|---|---|---|---|---|
| Control G | 25/0 | 0 | 2 | 0.0 | 0.0 |
| 13 | 23/2 | 11 | 1 | 35.2 | 0.0 |
| 14 | 20/5 | 27 | 1 | 72.5 | 0.5 |
| 15 | 15/10 | 50 | 1 | 76.7 | 10.0 |
| Control H | 0/25 | 100 | 1 | 77.4 | 80.0 |

It is found that a 20:5 mixture of concentrated solvent-extractant affords 72.5% of copper extraction and only 0.5% of iron extraction, indicating that very high efficiency is possible at higher concentrations of the extractants. It was also noted that separation of the aqueous and organic phase is rapid and essentially complete within a minute after mixing is stopped for the 23:2 and 20:5 mixtures. The 15:10 mixtures separates more slowly, requiring approximately 5 minutes for good separation.

The systems described in Examples 13–16 are stripped with 6 normal aqueous sulfuric acid, using essentially the same procedure as in the extraction. 25 ml. of acid are shaken with the 25 ml. loaded organic phase for 1 minute, allowed to separate and the aqueous phase analyzed. This is done twice to simulate two steps of stripping. The results obtained are set forth in Table 5.

Table 5.

Stripping Efficiency in Recovering Copper from 5,8-diethyl-7-hydroxydodecan-6-one oxime and DNNSA Solvent-Extractant

| Ratio of 10% oxime to 25% DNNSA | Stripping Time, Min. | Initial Cu loading,g/l. | % Copper Removed First Stage | Second Stage |
|---|---|---|---|---|
| 23/2 | 1 | 1.41 | 62.5 | 84.7 |
| 20/5 | 1 | 2.77 | 59.8 | 79.4 |
| 15/10 | 1 | 3.07 | 90.5 | 97.1 |
| 0/25 | 1 | 3.10 | 89.1 | 95.7 |

The stripping efficiency is generally high, but there is a minimum at the 20:5 ratio. This suggests formation of an oxime:sulfonic acid-Cu(II) complex in that concentration range. The normal amber color of the sulfonic acid is completely lacking in the 20:5 mixture after equilibration with copper solutions, and is replaced by a very deep blue-green color.

EXAMPLES 16 – 19

The procedures of Examples 1 to 3 are repeated substituting didodecylnaphthalene sulfonic acid (DDNSA) at 11.8 wt. % in kerosene for the DNNSA at 10 wt. %. In addition, 1 run is carried out with a ratio of 10:15 oxime/DDNSA. For comparision purposes, solvent-extractants are prepared with the oxime alone, and with the DDNSA alone. The procedures, conditions and the results obtained are set forth in Table 6.

Table 6.

Separation of Copper in the Presence of Iron with 5,8-diethyl-7-hydroxydodecan-6-one oxime and DDNSA at pH 1.6

| Example | Ratio, 4% oxime: 11.8% DDNSA | Mole % of DDNSA in oxime & DDNSA | Mixing Time, Minutes | % Copper Extracted | % Iron Extracted |
|---|---|---|---|---|---|
| Control I | 25:0 | 0 | 2 | 0.0 | 0.0 |

Table 6.-continued

Separation of Copper in the Presence of Iron with 5,8-diethyl-7-hydroxydodecan-6-one oxime and DDNSA at pH 1.6

| Example | Ratio, 4% oxime: 11.8% DDNSA | Mole % of DDNSA in oxime & DDNSA | Mixing Time, Minutes | % Copper Extracted | % Iron Extracted |
|---|---|---|---|---|---|
| 16 | 23:2 | 11 | 1 | 14.4 | 0.0 |
| 17 | 20:5 | 27 | 1 | 28.2 | 0.0 |
| 18 | 15:10 | 50 | 1 | 36.7 | 2.9 |
| 19 | 10:15 | 69 | 1 | 40.7 | 9.7 |
| Control J | 0:25 | 100 | 1 | 44.8 | 40.8 |

It is seen that copper is rapidly extracted by the combination of oxime and sulfonic acid and selectivity of the solvent-extractant composition for copper in the presence of iron is very high.

The copper can be recovered from the solvent-extractant by acid stripping, as set forth above.

EXAMPLES 20 – 26

Aqueous feed solutions are prepared from 8.96 g./l. of $NiSO_4 \cdot 6H_2O$; 9.96 g./l. $Fe_2(SO_4)_3 \cdot xH_2O$ and 2.00 g./l. $FeSO_4 \cdot 7H_2O$. The final metal value contents of the feed solution is 2.0 g./l. Ni(II); 2g./l. Fe (III) and 0.4 g./l. Fe (III). The feeds are divided into three portions and the pH's are adjusted with 6 N $H_2SO_4$ to 1.0, 1.4 and 2.0, respectively.

Solvent-extractants are made by mixing combinations of 4 weight % solutions of 5,8-diethyl-7-hydroxydodecan-6-one oxime and 10 weight % of dinonylnaphthalene sulfonic acid in kerosene. These are mixed at ratios ranging from 20:5 to 15:10. 25 ml. of each feed and each solvent-extractants are contacted and mixed for 1 minute, then allowed to separate, and the aqueous raffinates are analyzed for nickel and iron. The results are set forth in Table 7.

Table 7.

| | Recovery of Nickel from Mixtures of Iron and Nickel with 5,8-diethyl-7-hydroxydodecan-6-one oxime and DNNSA | | | |
|---|---|---|---|---|
| Example | Ratio, 4% oxime: 10% DNNSA | Mole % DNNSA in oxime & DNNSA | % Nickel Extracted | % Iron Extracted |
| | pH 1.0 | | | |
| 20 | 20/5 | 27 | 6.0 | 0.0 |
| 21 | 15/10 | 50 | 24.6 | 0.0 |
| | pH 1.4 | | | |
| 22 | 20/5 | 27 | 14.0 | 6.3 |
| 23 | 15/10 | 50 | 32.6 | 0.0 |
| 24 | 10/15 | 69 | 38.0 | 17.8 |
| | pH 2.0 | | | |
| 25 | 20/5 | 27 | 13.5 | 0.0 |
| 26 | 15/10 | 50 | 38.0 | 0.3 |

The above results show that the solvent-extractant compositions according to this invention rapidly remove nickel from aqueous solutions which also contain iron, and they further demonstrate excellent selectivity for nickel in the presence of iron.

The nickel is recovered from the loaded solvent-extractant by stripping with acid as described in the foregoing examples.

EXAMPLES 27 – 29

Aqueous feed solutions are prepared containing metal value contents corresponding to 2g./l of cobalt and 2g./l of nickel, and the pH's of 3 portions are adjusted to 0.98, 1.50 and 2.0 with 6 N $H_2SO_4$. Solvent-extractant compositions are prepared by dissolving 4 wt. % of 5,-8-diethyl-7-hydroxydodecan-6-one oxime and 10 wt. % of DNNSA in kerosene, and mixing the solutions in volume ratios of 15/10. For control purposes, solvent-extractants comprising 4 wt. % of the oxime in kerosene and 10 wt. % of DNNSA in kerosene are also prepared. Each extractant is conditioned first by mixing against 15 ml. of 2 N $H_2SO_4$. Twenty five milliliters of each feed and of each solvent-extractant are mixed for 1 minute in a 250 ml. separatory funnel, except for that containing the oxime extractant alone, which is mixed for 5 minutes. The aqueous raffinates are analyzed for nickel and cobalt content. The results are set forth in Table 8:

Table 8.

| | Recovery of Nickel from Mixtures of Nickel and Cobalt with 5,8-diethyl-7-hydroxydodecan-6-one oxime and DNNSA | | | |
|---|---|---|---|---|
| Example | Ratio, 4% oxime: 10% DNNSA | Mole % DNNSA in oxime & DNNSA | % Nickel Extracted | % Cobalt Extracted |
| | pH 0.98 | | | |
| Control K | 25:0 | 0 | 0.0 | 0.0 |
| 27 | 15:10 | 50 | 34.7 | 3.4 |
| Control L | 0:25 | 100 | 45.8 | 49.3 |
| | pH 1.50 | | | |
| Control M | 25:0 | 0 | 0.7 | 0.0 |
| 28 | 15:10 | 50 | 49.0 | 2.7 |
| Control N | 0:25 | 100 | 66.5 | 72.3 |
| | pH 2.0 | | | |

Table 8.-continued

Recovery of Nickel from Mixtures of
Nickel and Cobalt with 5,8-diethyl-
7-hydroxydodecan-6-one oxime and DNNSA

| Example | Ratio, 4% oxime: 10% DNNSA | Mole % DNNSA in oxime & DNNSA | % Nickel Extracted | % Cobalt Extracted |
|---|---|---|---|---|
| Control O | 25:0 | 0 | 0.0 | 0.0 |
| 29 | 15:10 | 50 | 44.0 | 6.7 |
| Control P | 0:25 | 100 | 69.0 | 69.5 |

It can be seen that nickel is rapidly extracted and that the separation of nickel from cobalt is enhanced using the combination of solvent-extractants according to this invention.

The metals can be stripped and recovered from the loaded solvent-extractant using acid as described in the foregoing examples. In a particular example, 25 ml. of the loaded solvent-extractant is contacted with 25 ml. of 20 wt. % $H_2SO_4$ and mixed for 1 minute. Analysis of the separated aqueous phase is then carried out. The results are set forth in Table 9.

Table 9.

Stripping of Cobalt from Solvent-
Extractants comprising 5,8-diethyl-7-
hydroxydodecan-6-one oxime and DNNSA

| Example | |
|---|---|
| 28A | 61% stripped |
| Control NA | 97% stripped |

It can be seen that with only 1 minute of contact time, a very substantial amount of the nickel is readily stripped from the solvent-extractant.

EXAMPLES 30 – 37

By the general procedure of Example 27, aqueous feed solutions containing copper and nickel at 2 g./l., respectively, of each metal value, are prepared adjusted to pHs of 1.0, 1.5, 2.0 and 2.5 with 6 N $H_2SO_4$. The aqueous raffinates are analyzed for copper and nickel content. The ratios of extractant compositions, and the results obtained, are set forth in Table 10.

Table 10.

Recovery of Copper from Mixtures of
Copper and Nickel with 5,8-diethyl-7-
hydroxydodecan-6-one oxime and DNNSA

| Example | Ratio, 4% oxime: 10% DNNSA | Mole % DNNSA oxime & DNNSA | % Copper Extracted | % Nickel Extracted |
|---|---|---|---|---|
| pH 1.0 | | | | |
| 30 | 20:5 | 27 | 52 | 0.8 |
| 31 | 15:10 | 50 | 40 | 10 |
| pH 1.5 | | | | |
| 32 | 20:5 | 27 | 54 | 1.4 |
| 33 | 15:10 | 50 | 53 | 17 |
| pH 2.0 | | | | |
| 34 | 20:5 | 27 | 55 | 0 |
| 35 | 15:10 | 50 | 59 | 15 |
| pH 2.5 | | | | |
| 36 | 20:5 | 27 | 55 | 0 |
| 37 | 15:10 | 50 | 61 | 14 |

It can be seen that copper is rapidly extracted and that the separation of copper from nickel is enhanced using this combination of solvent-extractants according to this invention.

EXAMPLES 38 – 45

The general procedure of Example 27 is employed with aqueous feed solutions containing 2 g./l. of copper and cobalt, respectively, at pH values adjusted to 1.0, 1.5, 2.0 and 2.5 with 6 N $H_2SO_4$. The aqueous raffinates are analyzed for copper and cobalt. The extractant composition ratios and the results obtained are set forth in Table 11.

Table 11.

Recovery of Copper from Mixtures of
Copper and Cobalt with 5,8-diethyl-7-
hydroxydodecan-6-one oxime and DNNSA

| Example | Ratio, 4% oxime: 10% DNNSA | Mole % DNNSA oxime & DNNSA | % Copper Extracted | % Cobalt Extracted |
|---|---|---|---|---|
| pH 1.0 | | | | |
| 38 | 20:5 | 27 | 47 | 0 |
| 39 | 15:10 | 50 | 44 | 1 |
| pH 1.5 | | | | |
| 40 | 20:5 | 27 | 47 | 0 |
| 41 | 15:10 | 50 | 53 | 1 |
| pH 2.0 | | | | |
| 42 | 20:5 | 27 | 47 | 0 |
| 43 | 15:10 | 50 | 61 | 3 |
| pH 2.5 | | | | |
| 44 | 20:5 | 27 | 48 | 1 |
| 45 | 15:10 | 50 | 65 | 5 |

It can be seen that copper is rapidly extracted and that the separation of copper from cobalt is enhanced using the combination of solvent-extractants according to this invention.

EXAMPLES 46 – 48

The general procedure of Example 27 is employed with aqueous feed solutions containing 2g./l. of copper and cobalt, respectively, adjusted to pH 2.0 with 6 N $H_2SO_4$, and based on total moles of DNNSA and oxime. The aqueous raffinates are analyzed for copper and cobalt content, respectively. The extractants are stripped with 20% $H_2SO_4$. The ratios of components in the extractant, and the results obtained are set forth in Table 12. For control purposes, the experiment is carried out with 13 parts by weight of DNNSA per 100 parts by weight of hydroxy oxime, which is the maximum suggested by Morin and Peterson, U.S. Pat. No. 3,878,286:

Table 12.

Recovery of Copper from Mixtures of
Copper and Cobalt with 5,8-hydroxydodecan-
6-one oxime and DNNSA

| Example | Parts DNNSA per 100 parts oxime | Mole % DNNSA in DNNSA & oxime | % Copper Extracted | % Cobalt Extracted | % Stripping of Copper |
|---|---|---|---|---|---|
| 46A | 13 | 7 | 12 |  | 92 |
| 46 | 30 | 15 | 29 | 0 | 55 |
| 47 | 60 | 27 | 47 | 0 | 53 |
| 48 | 167 | 50 | 64 | 4 | 83 |

It can be seen that the procedure according to the present invention, Examples 46–48, provides a substantial increase in the amount of copper extracted, the amount of copper extracted being increased by 2 ½ fold. in comparison with the procedure following the prior art (Control Example 46A).

The stripping results taken with the extraction percentages indicate a further commercially important benefit with the present process. Although the amount recovered on stripping with the control sample, one stage, is 92%, this solution contains only 12% of the copper values originally present in the feed. On the other hand, at best 53% of the copper can be recovered in one stage from the loaded extractant produced in one step by the present process, and this indicates that fewer extraction stages and stripping stages combined can be employed with a mole percentage of DNNSA only slightly above the minimum, 10, found critical in the present invention. In the higher end of the preferred range, 167 mole %, highly efficient stripping occurs, and this, combined with the 64% extraction, indicates that even fewer extraction and stripping stages will be sufficient here.

EXAMPLES 49 – 54

By the general procedure of Example 27, aqueous feed solutions containing cobalt and zinc at 2 g./l., respectively, of each metal value, are prepared and adjusted to pHs of 1.0, 1.5 and 2.0, with 6 $H_2SO_4$. The aqueous raffinates are analyzed for cobalt and zinc content. The ratio of extractant compositions and the results obtained are set forth in Table 13:

Table 13.

Recovery of Cobalt from Mixtures of
Cobalt and Zinc with 5,8-diethyl-7-
hydroxydodecan-6-one oxime and DNNSA

| Example | 4% Oxime: 10% DNNSA Extractant Volume Ratio | Mole % of DNNSA in DNNSA & oxime | % Cobalt Extracted | % Zinc Extracted |
|---|---|---|---|---|
| | | pH 1.0 | | |
| 49 | 20:5 | 27 | 15 | 10 |
| 50 | 15:10 | 50 | 18 | 5 |
| | | pH 1.5 | | |
| 51 | 20:5 | 27 | 50 | 16 |
| 52 | 15:10 | 50 | 33 | 12 |
| | | pH 2.0 | | |
| 53 | 20:5 | 27 | 36 | 19 |
| 54 | 15:10 | 50 | 31 | 10 |

It can be seen that cobalt is rapidly extracted and that the separation of cobalt from zinc is enhanced using the combination of solvent-extractants according to this invention.

EXAMPLES 55 – 60

By the general procedure of Example 27, aqueous feed solutions containing copper and zinc at 2 g./l. respectively, of each metal value, are prepared and adjusted to pHs of 1.0, 1.5 and 2.0 with 6 N $H_2SO_4$. The aqueous raffinates are analyzed for copper and zinc content. The ratios of extractant compositions, and the results obtained, are set forth in Table 14.

Table 14.

Recovery of Copper from Mixtures of Copper
and Zinc with 5,8-diethyl-7-hydroxydodecan-6-
one oxime and DNNSA

| Example | Ratio, 4% Oxime: 10% DNNSA | Mole % DNNSA in Oxime & DNNSA | % Copper Extracted | % Zinc Extracted |
|---|---|---|---|---|
| | | pH 1.0 | | |
| 55 | 20:5 | 27 | 46 | 1.0 |
| 56 | 15:10 | 50 | 37 | 2.0 |
| | | pH 1.5 | | |
| 57 | 20:5 | 27 | 44 | 2 |
| 58 | 15:10 | 50 | 51 | 3 |
| | | pH 2.0 | | |
| 59 | 20:5 | 27 | 45 | 0.5 |
| 60 | 15:10 | 50 | 47 | 5 |

It can be seen that copper is rapidly extracted and that the separation of copper from zinc in enhanced using the combination of solvent-extractants according to this invention.

EXAMPLES 61 – 66

The general procedure of Example 27 is employed with aqueous feed solutions containing 2 g./l. of nickel and zinc, respectively at pH values adjusted to 1.0, 1.5 and 2.0 with 6 N $H_2SO_4$. The aqueous raffinates are analyzed for nickel and zinc. The extractant composition ratios and the results obtained, are set forth in Table 15.

Table 15.

Recovery of Copper from Mixtures of Nickel
and Zinc with 5,8-diethyl-7-hydroxydodecan-
6-one oxime and DNNSA

| Example | Ratio, 4% Oxime: 10% DNNSA | Mole % DNNSA in Oxime & DNNSA | % Nickel Extracted | % Zinc Extracted |
|---|---|---|---|---|
| pH 1.0 | | | | |
| 61 | 20:5 | 27 | 5 | 0.4 |
| 62 | 15:10 | 50 | 15 | 2.0 |
| pH 1.5 | | | | |
| 63 | 20:5 | 27 | 10 | 22 |
| 64 | 15:10 | 50 | 40 | 6 |
| pH 2.0 | | | | |
| 65 | 20:5 | 27 | 11 | 32 |
| 66 | 15:10 | 50 | 38 | 8 |

It can be seen that either nickel or zinc is rapidly extracted depending on the relative ratios of oximes and sulfonic acid in the extractants and that the separation of nickel from zinc is enhanced using the combination of solvent-extractants according to this invention.

EXAMPES 67 – 72

By the general procedure of Example 27, aqueous feed solutions containing zinc and iron (Fe +++) at 2 g./l. and iron (Fe+++) at 0.4 g./l., respectively, of each metal value, are prepared and adjusted to pHs of 1.0, 1.5 and 2.3 with 6 N H₂SO₄. The aqueous raffinates are analyzed for zinc and iron content. The ratio of extractant compositions and the results obtained are set forth in Table 16.

Table 16.

Recovery of Zinc from Mixtures of Zinc and
Iron with 5,8-diethyl-7-hydroxydodecan-6-
one oxime and DNNSA

| Example | 4% Oxime: 10% DNNSA Extractant Volume Ratio | Mole % of DNNSA in DNNSA & Oxime | % Zinc Extracted | % Iron Extracted |
|---|---|---|---|---|
| pH 1.0 | | | | |
| 67 | 20:5 | 27 | 16 | 8 |
| 68 | 15:10 | 50 | 5 | 13 |
| pH 1.5 | | | | |
| 69 | 20:5 | 27 | 24 | 12 |
| 70 | 15:10 | 50 | 14 | 16 |
| pH 2.3 | | | | |
| 71 | 22:3 | 17 | 26 | 0 |
| 72 | 20:5 | 27 | 24.5 | 5 |

It can be seen that zinc or iron is rapidly extracted depending on the relative ratios of oxime and sulfonic acid in the solvents and that the separation of iron from zinc is enhanced using the combination of solvent-extractants according to this invention.

Obviously, many variations of the invention will suggest themselves in view of the above-identified description. All such obvious variations are to be within the full intended scope of the appended claims.

I claim:

1. A process for recovering a first metal value from an aqueous solution comprising a pair of said first metal value and a second metal value, said pair being selected from the group consisting of copper and iron, nickel and iron, nickel and cobalt, copper and cobalt, copper and nickel, copper and zinc, zinc and nickel, nickel and zinc, zinc and iron, and cobalt and zinc, said process comprising contacting said aqueous solution at a pH of below about 3 with a solvent-extractant consisting of (i) an aliphatic α-hydroxy oxime, (ii) an alkylaromatic sulfonic acid having a molecular weight of at least about 400 and (ii) a water-immiscible solvent for (i) and (ii) and metal complexes thereof to provide a solution of said first metal value in said solvent-extractant, the mole % of (ii) in the combined (i) and (ii) being in the range of 10 to 80; separating the solution thus formed from the aqueous raffinate depleted in said first metal value; and recovering said first metal value from said separated solution.

2. A process as defined in claim 1 wherein component (i) comprises an aliphatic α-hydroxy oxime of the formula:

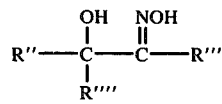

wherein R' and R''' are organic hydrocarbon radicals and R'''' is a hydrogen or a hydrocarbon radical.

3. A process as defined in claim 2 wherein said aliphatic α-hydroxy oxime is 5,-8-diethyl-7-hydroxydodecan-6-one oxime.

4. A process as defined in claim 1 wherein said alkyl aromatic sulfonic acid (ii) is a polyalkyl aromatic sulfonic acid.

5. A process as defined in claim 4 wherein said polysulfonic acid is dinonylnaphthalene sulfonic acid.

6. A process as defined in claim 4 wherein said polyalkyl aromatic sulfonic acid is didodecylnaphthalene sulfonic acid.

7. A process as defined in claim 1 wherein the mole % of (ii) in combined (i) and (ii) is in the range of 15 to 70.

8. A process as defined in claim 1 wherein the mole % of (ii) in combined (i) and (ii) is in the range of 15 to 55.

9. A process as defined in claim 1 wherein said first metal value is recovered from said separated solution by acid stripping.

10. A process as defined in claim 1 wherein said pair comprises copper and iron and said pH is in the range of 0.9 to 2.0.

11. A process as defined in claim 1 wherein said pair comprises nickel and iron and said pH is in the range of 1.0 to 2.0.

12. A process as defined in claim 1 wherein said pair comprises nickel and cobalt and said pH is in the range of 0.98 to 2.0.

13. A process as defined in claim 1 wherein said pair comprises copper and nickel and said pH is in the range of 1.0 to 2.5.

14. A process as defined in claim 1 wherein said pair comprises copper and cobalt and said pH is in the range of 1.0 to 2.5.

15. A process as defined in claim 1 wherein said pair comprises copper and zinc and said pH is in the range of 1.0 to 2.0.

16. A process as defined in claim 1 wherein said pair comprises nickel and zinc and said pH in in the range of 1.0 to 2.0.

17. A process ad defined in claim 1 wherein said pair comprises zinc and nickel and said pH is in the range of 1.5 to 2.0.

18. A process as defined in claim 1 wherein said pair comprises zinc and iron and said pH is in the range of 1.0 to 2.3.

19. A process for recovering copper values from an aqueous solution comprising copper values and iron values, said process comprising contacting said aqueous solution at a pH of from 0.9 to about 2 with a solvent-extractant consisting of (i) 5,8-diethyl-7-hydroxydodecan-6-one oxime, (ii) dionorylnaphthalene sulfonic acid and (iii) kerosene, the mole % of (ii) in combined (i) and (ii) being in the range of 10 to 70; separating the solution thus formed from the aqueous raffinate depleted in said copper values, and recovering said copper values from said separating solution by acid stripping.

20. A process for recovering nickel values from an aqueous solution comprising nickel values and cobalt values, said process comprising contacting said aqueous solution at a pH of from 0.98 to about 2.0 with a solvent-extractant consisting of (i) 5,8-diethyl-7-hydroxydodecan-6-one oxime, (ii) dinonylnaphthalene sulfonic acid and (iii) kerosene, the mole % of (ii) in combined (i) and (ii) being in the range of about 50; separating the solution thus formed from the aqueous raffinate depleted in said nickel values; and recovering said nickel values from said separated solution by acid stripping.

21. A process for recovering nickel values from an aqueous solution comprising nickel values and iron values, said process comprising contacting said aqueous solution at a pH of from 1.0 to about 2.0 with a solvent-extractant consisting of (i) 5,8-diethyl-7-hydroxydodecan-6-one oxime, (ii) dinonylnaphthalene sulfonic acid and (iii) kerosene, the mole % of (ii) in combined (i) and (ii) being in the range of 25 to 70; separating the solution thus formed from the aqueous raffinate depleted in said nickel values; and recovering said nickel values from said separated solution by acid stripping.

22. A process for recovering copper values from an aqueous solution comprising copper values and nickel values, said process comprising contacting said aqueous solution at a pH of from 1.0 to abut 2.5 with a solvent-extractant consisting of (i), 5,8-diethyl-7-hydroxydodecan-6-one oxime, (ii) dinonylnaphthalene sulfonic acid and (iii) kerosene, the mole % of (ii) in combined (i) and (ii) being in the range of 25 to 50; separating the solution thus formed from the aqueous raffinate depleted in said copper values; and recovering said copper values from said separated solution by acid stripping.

23. A process for recovering copper values from an aqueous solution comprising copper values and cobalt values, said process comprising contacting said aqueous solution at a pH of from 1.0 to about 2.5 with a solvent-extractant consisting of (i) 5,8-diethyl-7-hydroxydodecan-6-one oxime, (ii) dinonylnaphthalene sulfonic acid and (iii) kerosene, the mole % of (ii) in combined (i) and (ii) being in the range of 25 to 50; separating the solution thus formed from the aqueous raffinate depleted in said copper values; and recovered said copper values from said separating solution by acid stripping.

24. A process from recovering copper values from an aqueous solution copper values and zinc values, said process comprising contacting said aqueous solution at a pH of from 1.0 to about 2.0 with a solvent-extractant consisting of (i) 5,8-diethyl-7-hydroxydodecan-6-one oxime, (ii) dinonylnaphthalene sulfonic acid and (iii) kerosene, the mole % of (ii) in combined (i) and (ii) being in the range of 25 to 50; separating the solution thus formed from the aqueous raffinate depleted in said copper values; and recovering said copper values from said separated by acid stripping.

25. A process for recovering nickel values from an aqueous solution comprising nickel values and zinc values, said process comprising contacting said aqueous solution at a pH of from 1.0 to about 2.0 with a solvent-extractant consisting of (i) 5,8-diethyl-7-hydroxydodecan-6-one oxime, the mole % of (ii) in combined (i) and (ii) being in the range of about 50; separating the solution thus formed from the aqueous raffinate depleted in said copper values; and recovering said copper values from said separated solution by acid stripping.

26. A process for recovering zinc values from an aqueous solution comprising zinc values and nickel values, said process comprising contacting said aqueous solution at a pH of from 1.5 to about 2.0 with a solvent-extractant consisting of (i) 5,8-diethyl-7-hydroxydodecan-6-one oxime, (ii) dinonylnaphthalene sulfonic acid and (iii) kerosene, the mole % of (ii) in combined (i) and (ii) being in the range of about 27; separating the solution thus formed from the aqueous raffinate depleted in said zinc values; and recovering said zinc values from said separated solution by acid stripping.

27. A process for recovering zinc values from an aqueous solution comprising zinc values and iron values, said process comprising contacting said aqueous solution at a pH of from 1.0 to 2.3 with a solvent-extractant consisting of (i) 5,8-diethyl-7-hydroxydodecan-6-one oxime, (ii) dinonylnaphthalene sulfonic acid and (iii) kerosene, the mole % of (ii) in combined (i) and (ii) being in the range of 15 to 50; separating the solution thus formed from the aqueous raffinate depleted in said copper values; and recovering said zinc values from said separated solution by acid stripping.

28. A process for recovering copper values from an aqueous solution comprising copper values and iron values, said process comprising contacting said aqueous solution at a pH of about 1.6 with a solvent-extractant consisting of (i) 5,8-diethyl-7-hydroxydodecan-6-one oxime, (ii) didodecylnaphthalene sulfonic acid and (iii) kerosene, the mole % of (ii) in combined (i) and (ii) being in the range of 10 to 70; separating the solution thus formed from the aqueous raffinate depleted in said copper values; and recovering said copper values from said separated solution by acid stripping.

* * * * *

UNITED STATES PATENT AND TRADEMARK OFFICE
CERTIFICATE OF CORRECTION

PATENT NO. : 4,018,865
DATED : April 19, 1977
INVENTOR(S) : LAWRENCE V. GALLACHER It is certified that error appears in the above-identified patent and that said Letters Patent are hereby corrected as shown below:

Col. 19, line 29, "separating" should read -- separated --;

Col. 20, line 8, "recovered" should read -- recovering --;

, line 9, "separating" should read -- separated --;

, line 21, after "separated" insert -- solution --; and

, line 27, after "oxime" insert -- (ii) dinonylnaphthalene sulfonic acid and (iii) kerosene --.

Signed and Sealed this thirtieth Day of August 1977

[SEAL]

Attest:

RUTH C. MASON
Attesting Officer

C. MARSHALL DANN
Commissioner of Patents and Trademarks